United States Patent [19]

Ohkubo

[11] Patent Number: 5,182,466
[45] Date of Patent: Jan. 26, 1993

[54] CONNECTION POLARITY SWITCHING APPARATUS

[75] Inventor: Yasuo Ohkubo, Miyoshi, Japan

[73] Assignee: Kabushiki Kaisha Toshiba, Kawasaki, Japan

[21] Appl. No.: 715,657

[22] Filed: Jun. 14, 1991

[30] Foreign Application Priority Data

Jun. 14, 1990 [JP] Japan .................. 2-155728

[51] Int. Cl.$^5$ .............................................. H02B 1/24
[52] U.S. Cl. ..................................... 307/127; 307/112
[58] Field of Search ............... 307/112, 113, 125, 127

[56] References Cited

U.S. PATENT DOCUMENTS

| | | | |
|---|---|---|---|
| 3,624,338 | 11/1971 | Ellis | 307/127 |
| 3,648,059 | 3/1972 | Beaudry et al. | 307/127 |
| 3,731,179 | 5/1973 | Rademaker | 307/127 |
| 4,520,419 | 5/1985 | Locher et al. | 307/127 |

Primary Examiner—Jeffrey A. Gaffin
Attorney, Agent, or Firm—Foley & Lardner

[57] ABSTRACT

An apparatus which is inserted in a signal transmission path between a network communications cable and a sending and receiving circuit. The apparatus enables switching of the connection polarity of the communications cable. This apparatus has an idle status detection section, a judgment section which responds to an idle status detection of the idle status detection section and judges the polarity of the communications cable on the basis of a signal level of the communications cable, and a polarity switching section which switches the polarity of the signal send and receive in accordance with a polarity indicated by polarity judgment signals output from the judgment portion. The use of this apparatus eliminates the necessity to recognize the polarity when connection work is performed, and simplifies the connection work itself.

2 Claims, 3 Drawing Sheets

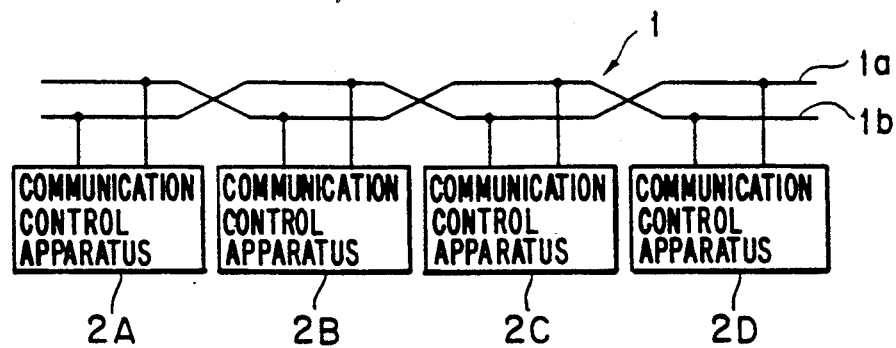
FIG. 1 PRIOR ART
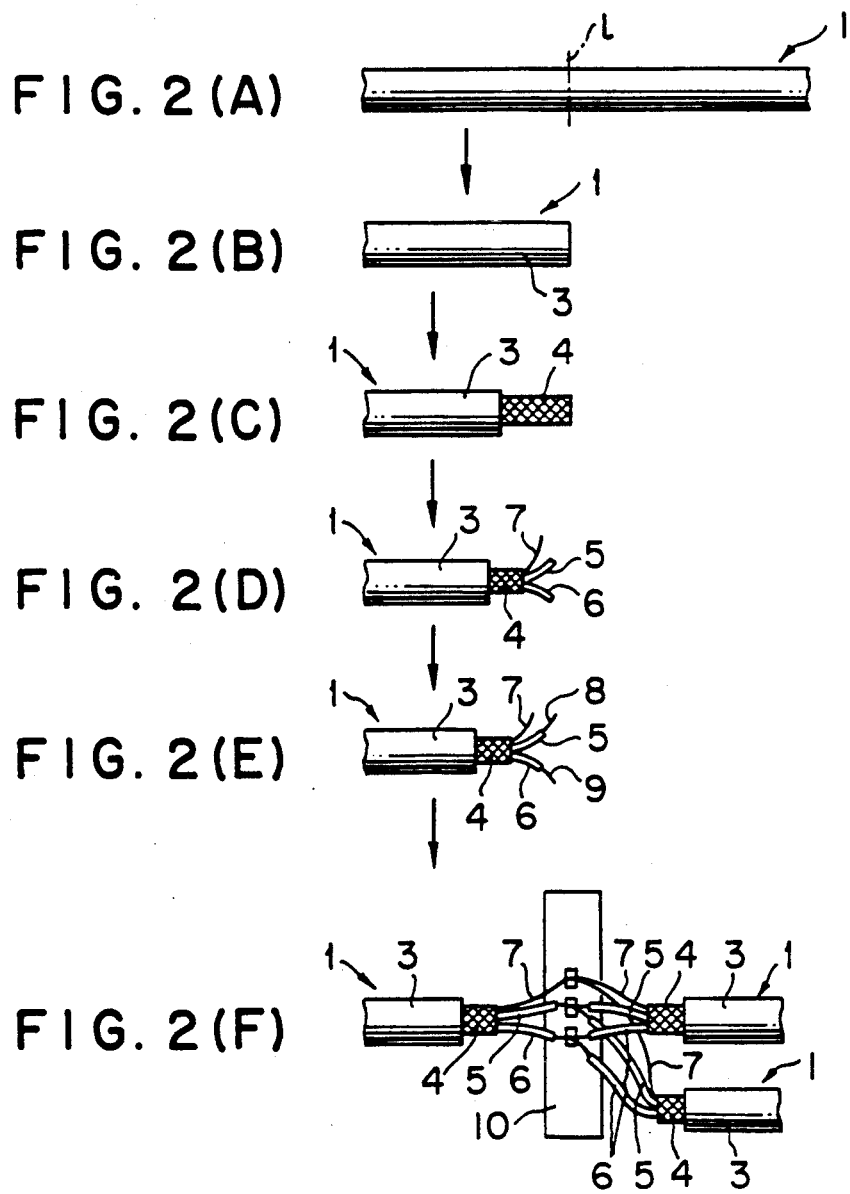
PRIOR ART

CONNECTION POLARITY SWITCHING APPARATUS

BACKGROUND OF THE INVENTION

The present invention relates to a connection polarity switching apparatus which is suitably used in a network that performs communications, using cables having polarities, and in particular, twisted pair cables with shields.

A twisted pair cable is one type of cable which is used for communications and has two mutually insulated wires twisted around each other, and is characterized as having a strong noise resistance since the respective influences of external disturbances upon each of the cables cancel each other out. Because of this, such twisted pair cables are used in environments, such as in vehicles, where there is a great deal of external noise. Furthermore, there is also the advantage that communications can be continued using the other wire should one of the wires be broken. Owing to this high reliability, twisted pair cables are selected for communication lines of computers that perform important control such as that of engine control system and hydraulic systems.

However, there are problems associated with twisted pair cables. The connection work of twisted pair cables, and in particular, for twisted pair cables having shields is very complex.

FIG. 1 shows a system where a plurality of communication control apparatuses 2A, 2B, 2C, 2D are connected to the same cable, and where this cable 1 is used as a shared bus. When a communication control apparatus is newly installed to such a system, the new apparatus must be branch connected with respect to the cable 1, and this work is performed as shown in FIG. 2(A) through (F).

First, as shown in FIG. 2(A), the cable 1 that configures the bus and the cables that are lead out from the communications control apparatus 2, are cut at suitable positions as shown by the broken line. Then, sheaths 3, shield meshes 4 and vinyl outer coverings 5 are successively removed to expose the wires 7 through 9. When these processes been completed, wires of both cables are connected to the connector 10, as shown in FIG. 2(F). Moreover, wires 8 and 9 correspond to one each of the lines 1a and 1b in FIG. 1.

In this manner, the branching and connection work for twisted pair cables involves many processes and is annoying and time consuming.

Furthermore, when there is such a connection structure, the shield effect deteriorates because the shield of the branching and connection portion must be removed, and signal leaks, the entry of external noise, signal reflection and the like due to changes in the line impedance (specifically, capacitance and inductance) cause problems of the generation of waveform distortion of signals to be transmitted.

In order to perform the branching and connection of coaxial cables by extremely simple operations, one conventional method using a needle-shaped connection member is widely used. Connection work using this needle-shaped connection member can be completed by the extremely simple operation of inserting the needles into the cable and so this type of fitting is often used for coaxial cables.

If this method can be applied to the branching and connection of twisted pair cables, then it would be possible to simplify the connection work and to alleviate the problem of waveform distortion. However, this has not been realized for the following reason.

When a twisted pair cable is used as a communications path, it is necessary to connect the polarities of wires correctly since each of the wires are biased to mutually different polarities. However, since twisted pair cables have two wires twisted together, the position of each wires is not fixed. Accordingly, it is not possible to perform accurate connection of the polarities with the needle-shaped connecting member since the inside of the cable is not checked. Because of presence of this problem, the inefficient connection method shown in FIG. 2 has to be used.

In addition, even if the connection method of FIG. 2 is used, a polarity identification method such as having colors on each of the power lines of the cable has to be used as a measure to prevent the connection of different polarities and this increases the cost of the cable.

It is therefore difficult to connect conventional communications cables since there are polarities in wires, and there is the problem of deterioration of the transmission path characteristics.

SUMMARY OF THE INVENTION

Accordingly, it is an object of the present invention to provide a connection polarity switching apparatus that enables the connection work to be performed without the necessity of recognizing the polarity.

According to the present invention, there is provided a connection polarity switching apparatus inserted in a signal transmission path between a network communications cable and a sending and receiving circuit that performs signal send and receive with respect to said communications cable, comprising an idle status detection means for detecting that a status of said network is an idle status, a judgment means or judging a polarity of said communications cable in response to an idle status detection of said idle status detection means on the basis of a signal level of said communications cable, and a polarity switching means for switching the polarity of said signal send and receive in accordance with a polarity indicated by polarity judgment signals output from said judgment means.

In the switching apparatus of the present invention, when the idle status is detected by an idle status detection means, the signal level of the communications cable is used as the basis to judge the polarity of the communications cable by the polarity judgment means, and this polarity is used as the basis for the polarity switching means to make the sending and receiving polarities of the sending and receiving circuit agree with the polarity of the communications cables. Because of this, it is not necessary to recognize the polarity when the connection work is performed, and it is possible to use a method using needle-shaped connectors so that the connection work is facilitated, the problem of waveform distortion of the transmission signals due to the connection structure is eliminated, and it is possible to manufacture the twisted pair cables less expensively since it is not necessary to have color coding or the like, on the plastic covers of the power lines.

BRIEF DESCRIPTION OF THE DRAWINGS

In the accompanying drawings:

FIG. 1 is a block diagram showing a system configuration of a network that uses a conventional twisted pair cable;

FIGS. 2(A)-2(F) are views describing the process of the branching and connection work of a conventional twisted pair cable;

DETAILED DESCRIPTION OF THE PREFERRED EMBODIMENT

The following is a description of an embodiment of the present invention, with reference to the accompanying figures.

Figure 3:
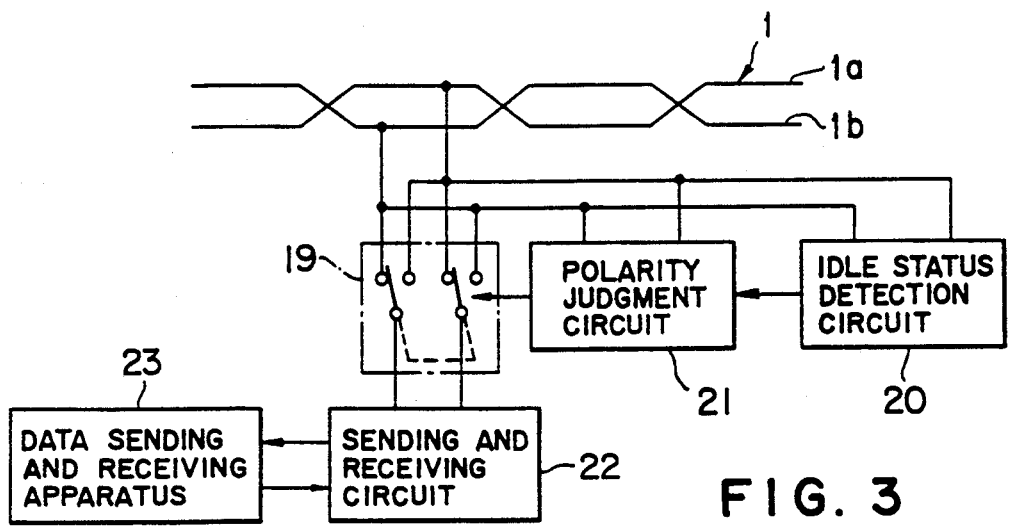
FIG. 3 is a block diagram of a connection polarity switching apparatus relating to one embodiment of the present invention.

FIG. 3 is a block diagram of an embodiment of a connection polarity switching apparatus of the present invention. This apparatus is configured from a two-circuit, three-contact polarity switching circuit 19 which is connected to a twisted pair cable 1, an idle status detection circuit 20 which detects the idle status for each wire of the twisted pair cable 1, and a polarity judgment circuit 21 which receives output signals of the idle status detection circuit 20, judges the polarity of the wires of twisted pair cable 1 and applies judgment signals to the polarity switching circuit 19. The twisted pair cable 1 is connected to the sending and receiving circuit 22 via the polarity switching circuit 19 and this sending and receiving circuit 22 is connected to the data sending and receiving apparatus 23.

Figure 4:
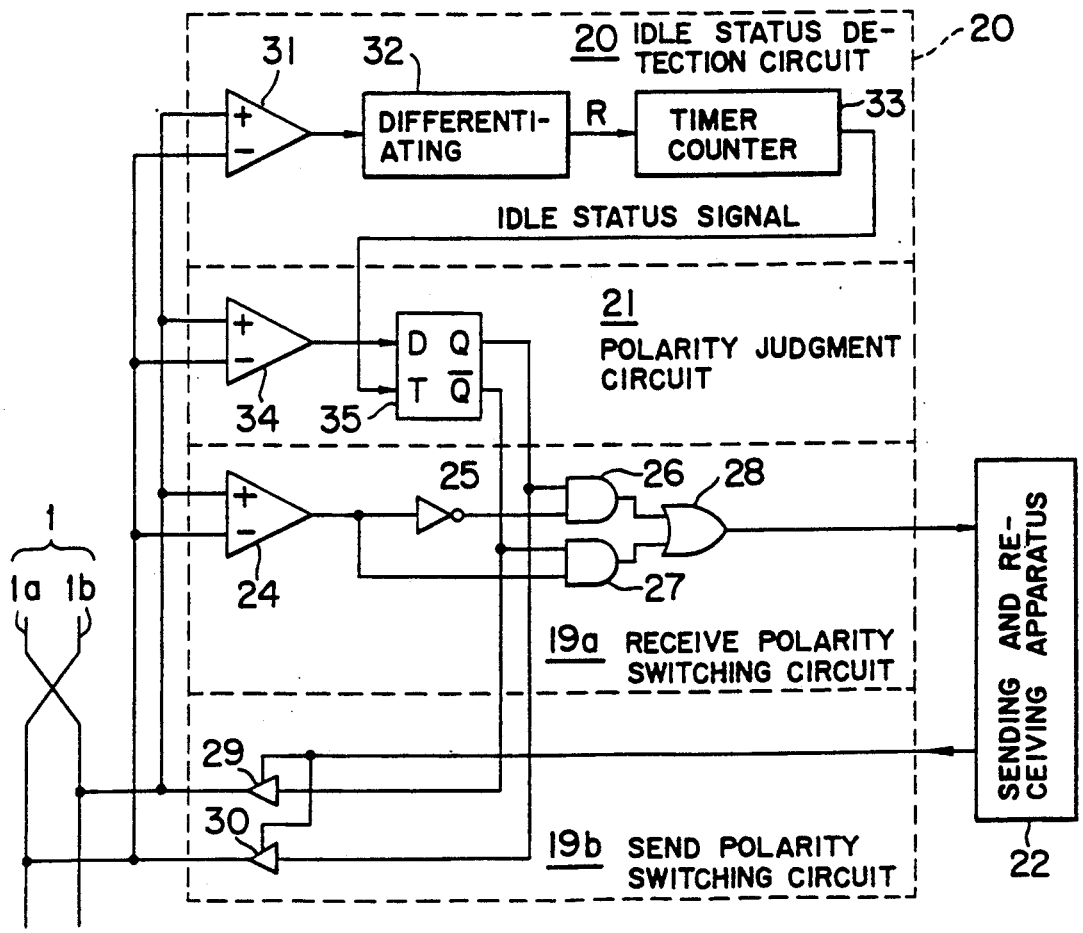
FIG. 4 is a detailed view of a connection polarity switching apparatus relating to the embodiment of the present invention.

FIG. 4 shows a detailed configuration of the connection switching apparatus according to the present invention. In this figure, the polarity switching circuit 19 is composed of a receive polarity switching circuit 19a and a send polarity switching circuit 19b. The receive polarity switching circuit 19a is configured from a differential type comparator 24, an inverter 25, AND gates 26, 27 and an OR gate 28. The positive terminal of the comparator 24 is connected to the line 1a, and the negative terminal is connected to the line 1b. Here, assuming that the line 1a has the voltage +VB and that the line 1b has the voltage −VB, the voltage 2 VB is applied to the comparator 24 and an "H" level signal is output, and assuming that the line 1a has the voltage −VB and that the line 1b has the voltage +VB, the voltage −2 VB is applied to the comparator 24 and an "L" level signal is output.

The output of the comparator 24 is level inverted by the inverter gate 25 and is input to the first input terminal of the AND gate 26, and is input at the same level to the first input terminal of the AND gate 27, and the output of the AND gates 26, 27 is input to the OR gate 28. Accordingly, signals that have mutually different levels are input to the second input terminal of the AND gates 26, 27 and consequently the output of the comparator 24 is taken out from the OR gate 28 at the same polarity or at the opposite polarity. The output of the OR gate 28 is input to the sending and receiving circuit 22 as the receiving signals, and it is possible to switch the receiving polarity be setting the input level to the above described two input terminals of the AND gates 26, 27.

The send polarity switching circuit 19b is configured by the tri-state buffers 29, 30, and to the control terminals of the buffers 29, 30 are input the drive signals from the sending and receiving circuit 22. The output of the buffer 29 is connected to the line 1a, and the output of the buffer 30 is connected to the line 1b. By such a configuration, signals that have mutually different levels are input to the data input terminals of the buffers 29, 30 so that switching between positive drive and negative drive can be performed by switching the polarity.

The idle status detection circuit 20 is configured by a differential type comparator 31 and a differentiating circuit 32, and the differential type comparator 31 has the same function as the differential type comparator 24 described above. The differentiating circuit 32 is configured so as to generate an "H" pulse each time the output level of the differential type comparator 31 changes, and so pulses are generated from the differentiating circuit 32 during the communications status, and there is no pulse generated during the idle status.

A timer counter 33 normally counts for as long as the reset terminal is not "H", and enters the overflow status after the count operation for a set timer time, and outputs "L" for count operation, and outputs "H" for during the overflow status. This timer time is set so as to be a slightly shorter time than the idle time, and the output signal of the differentiating circuit 32 is input to the reset terminal of this timer counter 33. Accordingly, during communication operation, the timer counter continues to be reset by the pulse from the differentiating circuit 32 and so the output of the timer counter 33 is maintained at "L", and once altered in idle status, and the set time of the timer has elapsed, the timer counter 33 enters the overflow status and outputs "H". This "H" signal is applied to the polarity judgment circuit 21 as the idle status judgment signal.

This polarity judgment circuit 21 is configured from a differential type comparator 34 and a D-type flip-flop 35 and the differential type comparator 34 has the same function as the comparators 24 and 31.

The D terminal of the D-type flip-flop 35 receives the output of the differential type comparator 34. The T terminal receives the output of the timer counter 33. The D-type flip-flop 35 latches the output level of the differential type comparator 34 in response to the idle status detection signal of the timer counter 33. That is, the level of the communications signals in the idle status is stored in this D-type flip-flop 35. Accordingly, when the polarity of the line 1a becomes positive and when the polarity of the line 1b becomes negative, the receive signals level during idle operation becomes "H," and becomes "L" in the opposite case. The receive signal level during the idle status is stored and maintained, so the output level is used to judge the polarity of the lines 1a, 1b. The second input terminal of the AND gate 26 in the receive polarity switching circuit 19a receives the output of the Q terminal of the D-type flip-flop 35, and the second input terminal of the AND gate 27 receives the output of the Q terminal of the D-type flip-flop 35.

Accordingly, when the receive signal level "L" for the D-type flip-flop 35 is stored (i.e. when the polarity of the line 1a is negative and when the polarity of the line 1b is positive), "L" is input to the second input terminal of the AND gate 26, and "H" is input to the second input terminal of the AND gate 27, and only the AND gate 27 opens and the receive signal is supplied to the sending and receiving circuit 22 at that level.

In addition, when the receive signal level "H" for the D-type flip-flop 35 is stored (i.e. when the polarity of the line 1a is positive and when the polarity of the line 1b is negative), "H" is input to the second input terminal of the AND gate 26, and "L" is input to the second input terminal of the AND gate 27, and only the AND gate 26 opens and the inverted receive signal is supplied to the sending and receiving circuit 22.

The output of the $\overline{Q}$ terminal of the D-type flip-flop 35 is input to the tri-state buffer 29, and the output of the Q terminal of the D-type flip-flop 35 is input to the tri-state buffer 30. Accordingly, when the D-type flip-flop 35 stores the polarity of the line 1a as negative and the polarity of the line 1b as positive, "H" is input to the tri-state buffer 29 to make the status that of positive drive, and "L" is input to the tri-state buffer 30 to make the status that of negative drive.

Conversely, when the D-type flip-flop 35 stores the polarity of the line 1a as positive and the polarity of the line 1b as negative, "L" is input to the tri-state buffer 29 to make the status that of negative drive, and "H" is input to the tri-state buffer 30 to make the status that positive drive.

Accordingly, for example, when the polarity of line 1a is negative and the polarity of line 1b is positive, if a controller is connected with polarities in the opposite manner, the initial status has "L" output from the Q terminal of the D-type flip-flop 35 and "H" output from the $\overline{Q}$ terminal of the D-type flip-flop 35. However, when the idle status occurs, the timer counter 33 outputs the idle status detection signals, and the status becomes such that "H" is output from the Q terminal of the D-type flip-flop 35 and "L" is output from the $\overline{Q}$ terminal of the D-type flip-flop 35 so that the sending and receive polarities are in agreement with the polarities of the lines 1a, 1b.

By this operation, it is not necessary to recognize the polarities of each of the wires of a twisted pair cable when a connection work is performed and so it is possible to use a needle-shaped connector.

Figure 5:
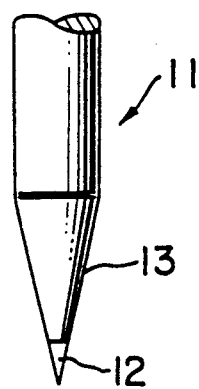
FIG. 5 is a front view of a needle-shaped connector member.
Figure 6:
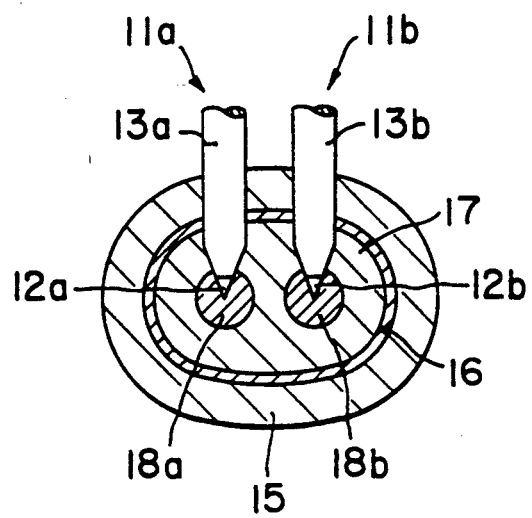
FIG. 6 is a lateral sectional front view showing the status of connection of a coaxial cable using the needle-shaped connector members shown in FIG. 5.
Figure 7:
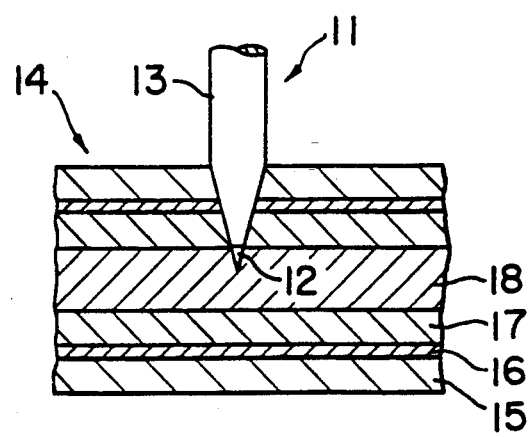
FIG. 7 is a longitudinal sectional front view showing the same status.

FIG. 5 is a front view of a needle-shaped connector member. The portions other than the tip portion 12 of this needle-shaped connector member 11 are covered with an insulating film 13 formed by an application of an insulating substance and this needle-shaped connector member 11 performs connection by insertion to the cable 14. When there is employed a twisted, pair cable, two fittings 11a and 11b are used with respect to the two core lines 18a and 18b and a third fitting (not shown) is used for the shield mesh 16. When there is connection work, in the status where these connector member are correctly fitted, the cable is set in a connecting apparatus (not shown) so that two core lines 18 become horizontally parallel. FIGS. 6 and 7 show the status of a needle-shaped connector apparatus, and the two connector member 11a, 11b pass through the sheath 15, the outer conductor mesh 16, and the insulating layer 17, so that the tip portions 12a, 12b conduct through to the core lines 18a, 18b, so that there is the status of electrical conduction with only the core wire.

By the use of the connection polarity switching apparatus of the present invention, it is not necessary to recognize the polarity of core lines when the cables are connected. Therefore, it is possible to facilitate connection of the cables through the use of needle-shaped connectors, and to reduce the number of processes. The problem of waveform distortion of the transmission signals is eliminated because the shield structure is maintained. In addition, it is not necessary to provide color coding to the plastic cover of the power line, so the twisted pair cables cost less to manufacture.

What is claimed is:

1. A connection polarity switching apparatus inserted in a single transmission path between a network communications cable having at least two lines and a sending and receiving circuit which performs signal send and receive with respect to said communications cable, comprising:

(a) an idle status detection means for detecting that a status of said network is an idle status, including:
      (1) a first comparison means, connected to said at least two lines and outputting a comparison signal,
      (2) a differentiating circuit, responsive to said comparison signal, for differentiating said comparison signal and providing an output, and
      (3) a count means, having a count time set shorter than a rated idle time, which starts a count operation in response to the output of said differentiating circuit and which outputs and idle status signal;

(b) a judgment means for judging a polarity of said communications cable in response to said idle status signal on the basis of a signal level of said communications cable and outputting polarity judgment signals corresponding to said communication cable polarity; and (c) a polarity switching means for switching the polarity of said signal send and receive in accordance with a polarity indicated by said polarity judgment signals output from said judgment means.

2. The connection polarity switching apparatus as claimed in claim 1, wherein said polarity judgment circuit comprises:
   (1) a second comparison means connected to said at least two lines and outputting a comparison signal; and
   (2) a D-type flip-flop which receives the comparison signal of said second comparison means as a D input, and the output of said count means as a clock input.

* * * * *